United States Patent [19]

Eriksson

[11] 4,324,573

[45] Apr. 13, 1982

[54] APPARATUS FOR REMOVING OIL FROM COMPRESSED AIR

[76] Inventor: Gunnar V. Eriksson, Högbyn, S-890 31, Arnäsvall, Sweden

[21] Appl. No.: 88,073

[22] Filed: Oct. 24, 1979

[51] Int. Cl.³ .............................................. B01D 45/00
[52] U.S. Cl. ...................................... 55/396; 55/437; 55/466
[58] Field of Search .................. 55/1, 270, 187, 391, 55/396, 428, 448, 456, 466, 342, 347, 437, 450, 457, 424

[56] References Cited

U.S. PATENT DOCUMENTS

| | | | |
|---|---|---|---|
| 557,109 | 3/1896 | Cochrane | 55/396 |
| 714,381 | 11/1902 | Koelkebeck | 55/396 |
| 2,659,450 | 11/1953 | Baird | 55/396 |
| 2,961,064 | 11/1960 | Fisher | 55/466 |
| 3,494,110 | 2/1970 | Reed et al. | 55/437 |
| 3,710,556 | 1/1973 | Barratt et al. | 55/466 |
| 4,032,296 | 6/1977 | Hall | 73/23.1 |

FOREIGN PATENT DOCUMENTS

| | | | |
|---|---|---|---|
| 1083473 | 6/1960 | Fed. Rep. of Germany | 55/396 |
| 25240 | of 1899 | United Kingdom | 55/396 |

*Primary Examiner*—Bernard Nozick
*Attorney, Agent, or Firm*—Larson and Taylor

[57] ABSTRACT

An oil separator connected to a machine operating with pulsating compressed air for separating an oil mist which is otherwise expelled together with the air and is let out in the ambient atmosphere when the compressed air is drained from the machine, the oil separator consists essentially of a tube or hose open at each end and connected at one end to the air outlet of the machine operating with compressed air, a tubular scraper sleeve (3) coaxially mounted in said tube through the other end and spaced radially therefrom, said tubular scraper sleeve extending substantially inside said tube or hose and some distance outside said tube or hose thereby forming an annular space between the overlapping portions of said sleeve and said tube or hose thereby providing free flow areas in said tube or hose, said sleeve and the annular space between the tube or hose and the sleeve, said annular space being provided with a plurality of channels surrounding said scraper sleeve and opened at each end so as to permit free flow therethrough, said channels extending substantially co-axially with the flow direction of the air between the overlapping portions of scraper sleeve and the tube or hose in which channels condensed oil is collected and moved out of the channels with a little portion of the air stream, whereas the main portion of the air flow is let out through the scraper sleeve.

8 Claims, 12 Drawing Figures

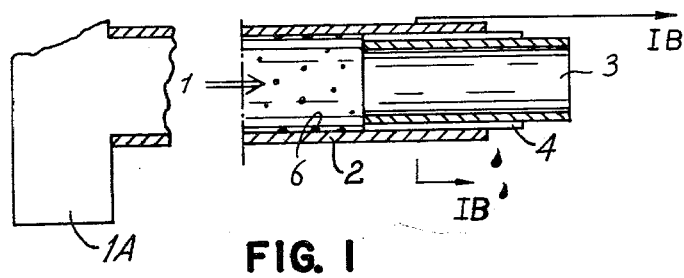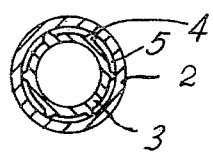
FIG. 1  FIG. 2
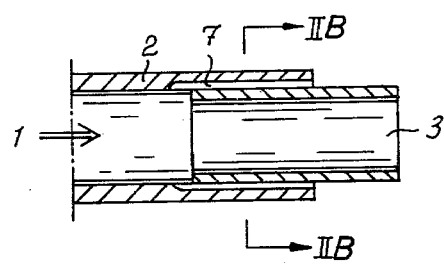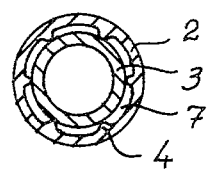
FIG. 3  FIG. 4
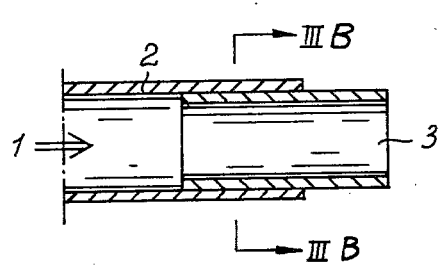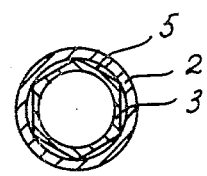
FIG. 5  FIG. 6
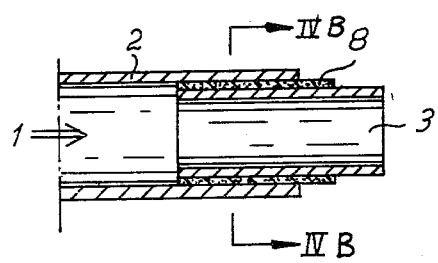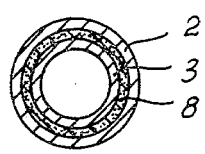
FIG. 7  FIG. 8

APPARATUS FOR REMOVING OIL FROM COMPRESSED AIR

The present invention relates to an apparatus for separating oil from compressed air especially adapted for machines operating with air pressure pulses of relatively short duration.

Air cylinder motors commonly used in the industrial field are operated by means of valves, which control the flow of fluid to the pressure side of the cylinder piston at the same time as the opposite side of the piston is drained. When the piston moves air is drained with high velocity into the ambient room from the draining side of the motor over the valve.

For operation-technical reasons both the valve and the cylinder must be lubricated, what is made by some type of mist lubrication apparatus which supplies oil mist to the compressed air. The said oil mist accompanies the air when it is finally drained into the ambient room. Apart from the practical disadvantages depending on the fatty and by time also dirty layer appearing everywhere around the valve outlet there are also medical health risks both to breath and to come in direct skin contact with the oil mist.

Consequently there are well motivated reasons to clean the air from oil before the air is let out into the factory locality. For this reason there are oil separators in the market, often combined with a sound damper, the operation of which are based on two main principles, separately or in combination with each other, separation via cyclones or separation via filters. The degree of separation for both types is good, but the nature of the design makes both types of apparatus relatively large and expensive. For these reasons oil separators are used relatively rarely in the industry.

The object of the present invention is to provide the intended oil separation by means of an apparatus which has small dimensions and which depending on its simple design can be manufactured at low costs.

The oil separator according to the invention comprises a tube or a hose through which the outlet air is moved. At the interior the tube or hose carries a scraping sleeve which is designed and mounted so as to provide one or more open channels between the hose and the scraping sleeve and which separates oil which has condensed on the hose wall.

It is very important that the open channels between the air hose and the scraper sleeve has so large area that some amount of secondary air also passes through said channels. At narrow channels indeed the oil is sucked into the channel space and it is also pressed out at the outlet side when the air impulse comes, but since the air impulse generally is of short duration the oil also has time to be sucked back into the space by the capillary forces.

The secondary air flow must be sufficient to convey the oil drops through the space, and in front of all the secondary air flow must be large enough to tear drops away at the outlet opening. On the other hand the secondary air flow must not be so large, have such high velocity, that the drops are torn into pieces thereby providing an oil mist.

Oil traps are previously known which at a cursory sight may seem to resemble the above described one. Thus the U.S. Pat. Nos. 2,659,450 and 2,186,344 and the Swedish Pat. No. 331 538 show oil traps in which the oil is caught in a sleeve and is allowed to run out through a little draining hole by the gravity forces and without the assistance of a secondary air flow. Such apparatus, however, are used in applications where there is a relatively constant air flow through the oil separator and where there is no risk that the oil is sucked back into the oil separation space. The object of the said previously known apparatus also is to clean the air before entering the apparatus operating with compressed air. Therefore all of said previously known oil separators are pressure vessels, and even a very little free area for a secondary air flow should consume non-acceptably large amounts of air in view of the operation economics.

By using a secondary air flow as oil expelling means like in the present embodiment also the very large advantage is gained that the outlet opening can be directed in any direction, even upwards. This is possible since the air flow gives a substantially stronger power action on the oil (in the flow direction) than that of the gravity force.

The invention will now be described closer with reference to the accompanying drawings which show some embodiments of the invention.

FIG. 1 shows an actual cross-section through one embodiment of an oil separator according to the invention, and FIG. 2 shows a cross-section along the line IB—IB of FIG. 1.

Correspondingly FIGS. 3, 4, 5, 6 and 7, 8 show variations of oil separators according to the invention.

Figure 9:
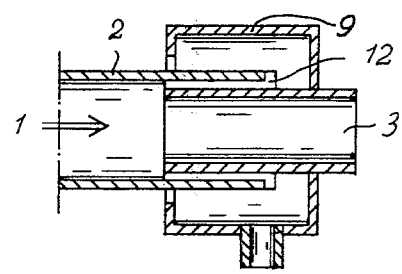
FIGS. 9 and 10 show axial cross-sections through two different embodiments of oil separators having a collection house for the oil.

In FIGS. 1 and 2 is shown an apparatus according to the invention in which an air stream 1 is cleaned from the oil mist. The apparatus comprises a tube or a hose 2 which at its outer end carries an inner scraper sleeve 3. The outer dimensions of the scraper sleeve 3 are less than the inner dimensions of the tube or hose 2, and for mounting of the scraper sleeve it has outer projections 4 providing one or more spaces or channels 5 between the hose 2 and the scraper sleeve 3. The scraper sleeve 3 is mountd so firmly in the hose 2 that it is not released by the action of the air stream 1, and preferably the scraper sleeve 3 is mounted so as to extend some distance outside the outer end of the tube or hose 2.

The air stream 1 which contains drops of oil is let out pulse by pulse from the compressed air machine 15 or the compressed air valve and it moves with a turbulent flow and with high velocity in the hose 2 in the direction of the arrow. The air may have an initial pressure of for instance 5–7 bars, and when the air expands in the hose 2 it is strongly cooled what causes the oil mist to condensate on available surfaces, i.e. on the inner walls of the hose 2. The turbulency of the air flow increases the probability that the oil mist contacts the hose wall and that the oil thereby condensates. The tube or hose 2 may be circular or may have any other cross-section form, and the cross-section area thereof is adapted so that the air speed along the hose wall is not so high that the oil drops which have condensated on the hose wall are torn away together with the air stream. The oil drops 6, which have condensed on the tube or hose wall are by the air stream brought to move in the flow direction until they reach the scraper sleeve 3. A small portion of the air stream is diverted through the channels 5 between the tube or hose 2 and the scraper sleeve 3, and the said small portion of the air stream forces the oil drops through the channels 5 so that they leave at the outer end of the tube or hose 2.

In FIGS. 3 and 4 is shown a modified embodiment of the invention in which the channels 5 are formed by axial grooves 7 in the air hose 2.

In FIGS. 5 and 6 is shown an embodiment of the invention in which the air channels 5 are provided in that the outer surface of the scraper sleeve 3 is formed as a polygon, but it is obvious that the same function is obtained if the inner surface of the outer tube 2 is formed with polygonal cross-section form. The channels 5 are most simply provided in the axial direction, but it is also possible to provide the channels in other ways, for instance in a spiral formation.

For the operation of the invention it is important that there is an open connection between the air hose and the scraper sleeve, viz. open channels between the said two parts. In FIG. 4 is shown an embodiment of the invention, in which the channels are provided in that a distance sleeve 8 of porous material is provided between the tube or hose 2 and the scraper sleeve 3, in which the pores of the porous material acts as a great number of connection channels.

In the above described apparatus the oil is sucked into the space or the channels between the hose 2 and the scraper sleeve 3 depending on capillary forces. The pressure difference over the space or the channels, i.e. the difference between the dynamic pressure provided by the air stream and the atmospheric pressure outside the tube or hose 2 thereafter causes the oil to move along the outer part of the hose, and the oil leaves the hose in the form of drops at the outer end of the hose.

Figure 10:
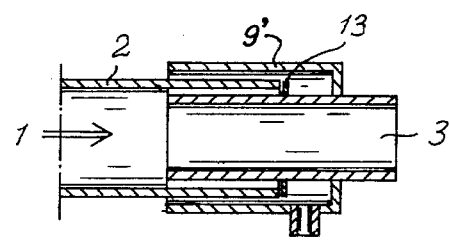
Figure 11:
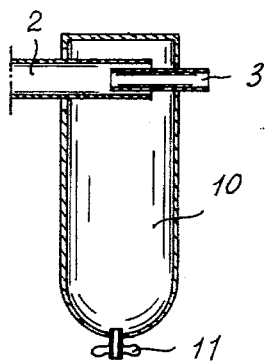
FIG. 11 is a longitudinal cross-section through an oil separator according to the invention having a large oil connection vessel.

In the embodiment of FIG. 9 the oil drops are collected in a vessel 9 which encloses the scraper sleeve 3. Preferably the said vessel 9 is drained to a larger container. FIG. 10 shows a slightly modified embodiment of an oil separator having a draining vessel 9'. In FIG. 11 is shown an embodiment of the invention in which the draining vessel 10 is large enough to be a collection vessel. The draining from the collection vessel 10 can be made by a bottom valve 11.

In the embodiments according to FIGS. 9-11 there is preferably provided a stop shoulder for the air hose, for instance a shoulder 12, FIG. 9, on some of the projections or a stop ring 13 FIG. 10, extending around the scraper sleeve 3.

Figure 12:
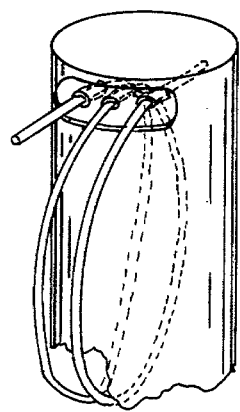
FIG. 12 is a perspective view of an apparatus having three scraper sleeves which can be mounted in the same collection vessel and which by connection in series by means of hoses gives a very effective oil separator.

A particularly good separation effect is obtained if several oil separators of the above described type are connected in series. A very suitable arrangement for such connection in series is shown in FIG. 12 and comprises several scraper sleeves which are mounted adjacent each other and in which the air outlet from the first sleeve is connected to the inlet of the next sleeve over a hose or pipe. The heavy diverting of the air by means of the hose causes the oil mist in the hose to be thrown against the hose wall, cyclone effect, and to fall out as a condensate.

It is to be understood that the above specification and the embodiments of the invention illustrated in the drawings are only illuminating examples and that all kinds of different modifications may be presented within the scope of the appended claims.

I claim:

1. An oil separator connected to a machine operating with pulsating compressed air for separating an oil mist which is otherwise expelled together with the air and is let out in the ambient atmosphere when the compressed air is drained from the machine, the oil separator consists essentially of a tube or hose open at each end and connected at one end to the air outlet of the machine operating with compressed air, a tubular scraper sleeve (3) coaxially mounted in said tube through the other end and spaced radially therefrom, said tubular scraper sleeve extending substantially inside said tube or hose and some distance outside said tube or hose thereby forming an annular space between the overlapping portions of said sleeve and said tube or hose thereby providing free flow areas in said tube or hose, said sleeve and the annular space between the tube or hose and the sleeve, said annular space being provided with a plurality of channels surrounding said scraper sleeve and opened at each end so as to permit free flow therethrough, said channels extending substantially co-axially with the flow direction of the air between the overlapping portions of scraper sleeve and the tube or hose, in which channels condensed oil is collected and moved out of the channels with a little portion of the air stream, whereas the main portion of the air flow is let out through the scraper sleeve.

2. Oil separator according to claim 1, wherein there are one or more spacer means between the scraper sleeve and the tube or hose comprising elongated projections on the scraper sleeve or on the air hose.

3. Oil separator according to claim 1, wherein the channels between the scraper sleeve and the hose comprises substantially longitudinally extending inner grooves of the air hose.

4. Oil separator according to claim 1, wherein the channels between the scraper sleeve and the hose are formed in that the outer contour of the scraper sleeve is formed as a polygonal as considered in cross-section, or in that the inner contour of the hose is formed as a polygon in cross-section.

5. Oil separator according to claim 1, wherein a spacer means is provided between the scraper sleeve and the hose which is a sleeve of a capillary porous material in which the pores of the said porous material provides connection channels for removing the oil.

6. Oil separator according to claims 1, 2, 3, 4, or 5, wherein the scraper sleeve is formed with a stop means which restricts the depth of mounting for the scraper sleeve in the air hose (2).

7. Oil separator according to claim 6, wherein the scraper sleeve is surrounded by a little housing for receiving the oil.

8. Oil separator according to claim 6, wherein the scraper sleeve is surrounded by a vessel for receiving and collecting the oil.

* * * * *